Sept. 22, 1925. 1,554,365

F. P. PARKER ET AL.

ELECTRIC COOKER

Filed March 1, 1923

Patented Sept. 22, 1925.

1,554,365

UNITED STATES PATENT OFFICE.

FRANK P. PARKER AND IRA E. JAGGERS, OF WICHITA FALLS, TEXAS.

ELECTRIC COOKER.

Application filed March 1, 1923. Serial No. 622,138.

*To all whom it may concern:*

Be it known that we, FRANK P. PARKER and IRA E. JAGGERS, citizens of the United States, residing at Wichita Falls, in the county of Wichita and State of Texas, have invented new and useful Improvements in Electric Cookers, of which the following is a specification.

This invention relates to new and useful improvements in electric cookers and refers more particularly to such a cooking device which may be expeditiously operated by a storage battery commonly used by automobiles.

Another object of the invention contemplates providing an electric cooker of this character which will afford an efficient cooking means for tourists and which may also be used to advantage in households, by operating the same from a current of one hundred and ten volts, which is the usual voltage supplied and utilized for the latter purpose.

The invention also aims to afford a durable and compact cooking apparatus which may be conveniently conveyed in an automobile and which may also be produced at a very nominal cost.

The above and other objects are attained by the mechanism illustrated in the accompanying drawings, showing the preferred embodiment of the invention, wherein.

Figure 2:
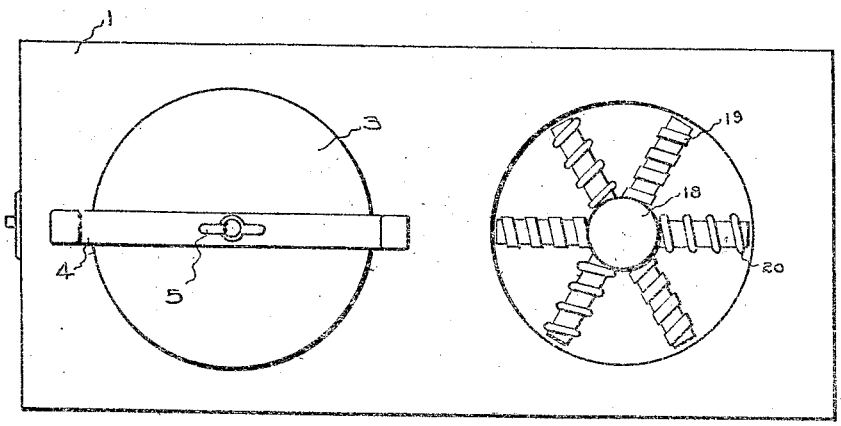
Figure 2 is a plan view of the invention.
Figure 1:
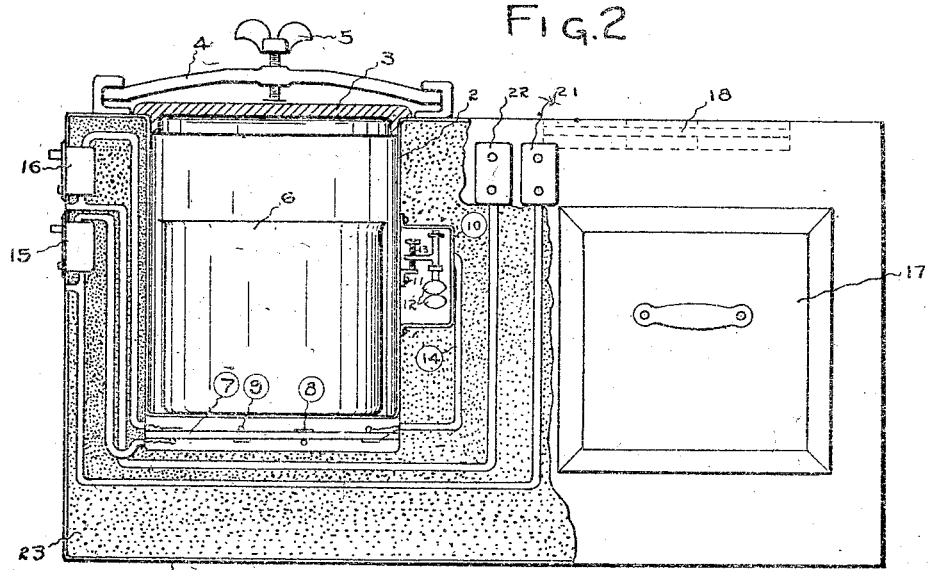
Figure 1 represents a side view of the invention, partly in section.

Proceeding in accordance with the present invention; a suitable housing 1 has situated in one side thereof a boiling chamber 2, which latter is provided with a cover 3. A clamp 4 extends over the top of this cover and is held securely in place by a winged nut 5. A kettle or other suitable receptacle is placed within this boiling chamber, which kettle is indicated by the numeral 6.

The heating element beneath the kettle 6 is comprised primarily of an electrode 7, to which is attached the wiring circuit 8 of the storage battery. Should it be desired to apply the device for household purposes, the wiring indicated by 9 is employed, which utilizes a current of one hundred and ten volts.

When a predetermined temperature is reached by the cooker, a thermostatic control or circuit breaker disconnects the current thereto, the housing of which latter member is indicated at 10. This circuit breaker is provided with an adjustable contact 11, which is suitably grounded as shown. For the proper function of this control arrangement, a pair of metal expansion members 12 are employed, which latter are constructed of a material which is very susceptible to heat and expands readily when subjected thereto. It will be readily observed that upon the expansion of these members, the contact post 13 disengages the grounded contact 11, by which the circuit is broken. In the drawing is also illustrated the means by which an adjustment may be made in this contact, which means consists of the screw or contact indicated also at 13. The contact post 13 forms a connection for the wires leading through the conduit 14 to the electrodes or heating units disposed beneath the boiling chamber 2. These wires convey the current of both, the battery and one hundred and ten volt current. The battery connection is controlled by a switch 16 and a similar switch 15 controls the hundred and ten volt circuit, previously mentioned.

In Figure 2 is illustrated the manner in which the cooker is applied for frying purposes, which arrangement consists primarily of a member 18, having a series of arms extending radially therefrom. A certain number of these arms are wrapped with wires 19, which convey the current from the storage battery, while a like number of arms bear the wires 20 of the hundred and ten voltage current. The latter is controlled by a suitable switch 21, turning on or off the current to the element 18, while a switch 22 controls the current leading from the storage battery to the element 18.

In order that the full effects attained from either heating element may be utilized to advantage, the space surrounding the boiling chamber is packed with any suitable heat insulating material, preferably ground cork or pulverized charcoal.

It will also be noted in the drawings that within the housing is situated adjacent the boiling chamber 2, a storage compartment 17, which may be used advantageously as a means for storing cooking utensils when not use.

In view of the foregoing, it is obvious that a complete and practical cooker for the purposes set forth has been contemplated and while it is believed that the nature and advantages thereof will be readily apparent, it should be understood that it is not desired that the invention should be limited to the specific disclosure herein set forth and that minor changes may be made in the arrangement and construction thereof as fall within the meaning and scope of what is herein claimed:

1. In an electric cooking apparatus of the character set forth, a housing; a boiling chamber in one side of said housing; a cover for said chamber; retaining means for the said cover; one or more heating electrodes adjacent the said boiling chamber; two wiring circuits attached to the said electrodes for high voltage circuits; an adjustable thermostatic circuit breaker in said circuits; a storage compartment within said housing adjacent said boiling chamber; a surface heating element thereabove; said latter element having a plurality of arms extending radially therefrom; low voltage wires in circuit surrounding a number of said arms; high voltage wires in circuit surrounding a like number of said arms and means for individually controlling the current to the said boiling chamber and the said surface heating element, substantially as described.

2. In an electric cooking apparatus, a housing; a boiling chamber; a storage compartment adjacent thereto; electrodes adjacent to the said boiling chamber; high and low voltage wires connected to the said electrodes; adjustable thermostatic current controlling means connected to said high and low voltage wires; a surface heating element disposed upon the upper portion of the said housing; means for supplying high and low voltage current thereto; means for individually controlling the said high and low voltage current to the said surface heating element and to the said boiling chamber; said boiling chamber being surrounded by heat insulating material.

FRANK P. PARKER.
IRA E. JAGGERS.